United States Patent
Suzuki et al.

(10) Patent No.: US 6,462,148 B1
(45) Date of Patent: *Oct. 8, 2002

(54) ADHESIVE FILM OF QUINOLINE POLYMER AND BISMALEIMIDE

(75) Inventors: Masahiro Suzuki; Shin Nishimura; Masao Suzuki; Akio Takahashi, all of Hitachi; Akira Kageyama, Tokyo; Yoshihiko Honda, Hitachi; Toshiyasu Kawai, Ichihara; Shinji Iioka, Ichihara; Yoshihiro Nomura, Ichihara, all of (JP)

(73) Assignee: Hitachi Chemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,203

(22) PCT Filed: Apr. 7, 1998

(86) PCT No.: PCT/JP98/01587
§ 371 (c)(1),
(2), (4) Date: Oct. 7, 1999

(30) Foreign Application Priority Data

Apr. 7, 1997 (JP) .............................. 9-087838
Apr. 7, 1997 (JP) .............................. 9-087839

(51) Int. Cl.[7] ............................. C08L 71/00
(52) U.S. Cl. .................. 525/534; 524/611; 525/66; 525/186; 525/480; 525/523; 525/530
(58) Field of Search ................ 525/534, 66, 480, 525/186, 523, 530; 524/611

(56) References Cited

U.S. PATENT DOCUMENTS

| 3,839,358 A | * | 10/1974 | Bargain |
| 5,017,677 A | * | 5/1991 | Stille ........................... 528/125 |
| 5,723,573 A | * | 3/1998 | Marrocco, III et al. ...... 528/425 |

FOREIGN PATENT DOCUMENTS

| EP | 407097 A2 | * | 1/1991 |
| JP | 57-159764 A2 | * | 10/1982 |
| JP | 4-108772 A2 | * | 4/1992 |
| JP | 7-227831 A | * | 3/1997 |
| WO | WO 92/03488 A1 | * | 3/1992 |

* cited by examiner

Primary Examiner—Robert E. L. Sellers
(74) Attorney, Agent, or Firm—Antonelli, Terry, Stout & Kraus, LLP

(57) ABSTRACT

A resin composition useful as an adhesive film and insulating material for a multilayer wiring substrate or electronic parts comprises (A) a polymer containing a quinoline ring represented by the formula (1) in the structure such as 6,6'-bis(2-(4-fluorophenyl)-4-phenylquinoline) and 4,4'-(1,1,1,3,3,3-hexafluoro-2,2-propylidene)bisphenol, and (B) a bismaleimide compound represented by the formula (2) such as 2,2-bis((4-maleimidophenoxy)phenyl)propane.

15 Claims, 2 Drawing Sheets

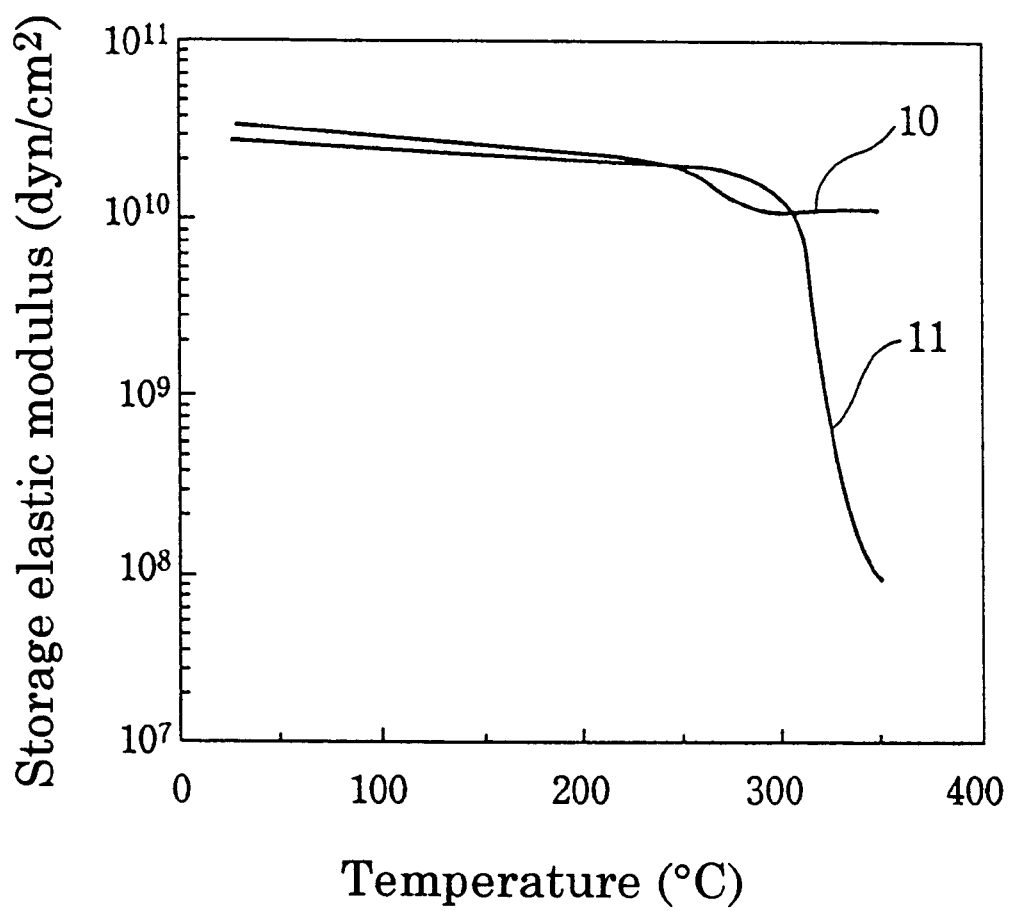

ADHESIVE FILM OF QUINOLINE POLYMER AND BISMALEIMIDE

TECHNICAL FIELD

This invention relates to a resin composition comprising a polymer containing a quinoline ring and a thermosetting resin, an insulating material constituted by said resin composition and an adhesive film, particularly to a resin composition for an interlayer insulation film excellent in electric characteristics, molding property and adhesiveness with a material to be adhered, and has a low moisture absorption ratio, an insulating material constituted by said resin composition and an adhesive film.

BACKGROUND ART

As an interlayer insulating membrane for electronic parts, a dehydration-condensation type polyimide resin polyimide resin has heretofore been used (Japanese Provisional Patent Publication No. 222444/1988). Whereas the above-mentioned polyimide resin is excellent in heat resistance, mechanical characteristics, etc., a polyamic acid varnish which is a precursor thereof is required to be stored in a refrigerator at −5° C. or less whereby it is insufficient in storage stability. Also, it requires curing at a high temperature of 350° C. or higher and the cured product has the problem that it has a large moisture absorption ratio. Moreover, when copper is used which is a representative conductive material and inferior in adhesiveness with a material to be adhered, it has a problem that it reacts during heating or the like, and has a problem in the point of reliability.

As a measure of the above, an investigation of a polymer containing a quinoline ring has been made in recent years, and synthetic methods thereof have been described in U.S. Pat. No. 4,000,187, U.S. Pat. No. 5,247,050, U.S. Pat. No. 5,247,050, etc. Also, as the other conventional example thereof, there may be mentioned Japanese Provisional Patent Publication No. 25286/1987.

A polymer containing a quinoline ring has low specific permittivity and dielectric dissipation factor, excellent in electric characteristics, low moisture absorption ratio and good stability at high temperatures, but it involves the problems that adhesiveness with a material to be adhered is bad, molding property is poor, and it dissolved in a solvent so that a multi-layered structure can be hardly prepared or the like. In particular, when it is used as an insulating material of a multi-layered wiring board or an interlaminar insulating membrane of LSI, etc., for preparing a multi-layered structure, an insulating layer is formed by using a polymer containing a quinoline ring previously dissolved in a solvent, and then, the next layer is similarly formed by using a polymer containing a quinoline ring dissolved in a solvent whereby an insulating layer is formed. However, the insulating layer previously formed is dissolved in a solvent so that a multi-layered structure can be difficultly formed. Moreover, in order to solve the above-mentioned problems, it can be considered a method in which a semi-cured film removing a solvent is formed, and molding is carried out under heating and pressure. However, the above film does not show flowability even when it is molded under heating and pressure so that, at present, it is difficult to apply the material to an insulating material for a multi-layered structure.

When the polymer containing a quinoline ring as mentioned above is used as an insulating material of a multi-layered wiring board or an interlaminar insulating membrane of LSI, etc., a multi-layered wiring board, etc. can be formed, for example, by forming a varnish previously dissolving in a solvent, coating it and drying to remove the solvent, and forming a conductive material by sputtering or chemical plating, etc., and the procedure is repeated. However, in this method, there are problems that a number of steps is much, an adhesiveness to the conductive material is poor, highly multi-layered structure can be difficultly prepared, and peeling occurs in a soldering step of LSI, etc., whereby reliability is insufficient, or the like.

An object of the present invention is to provide a resin composition and an adhesive film each excellent in molding property and has high adhesive force witha conductive material, resin, ceramics, etc. without impairing electric characteristics, low moisture absorption ratio and thermal stability at high temperatures.

DISCLOSURE OF THE INVENTION

Summary of the present invention which solves the above problems is as follows.

The first invention is a resin composition which comprises, as essential components, (A) a polymer containing a quinoline ring represented by the following formula (1) in the structure, and (B) a bismaleimide compound represented by the following formula (2).

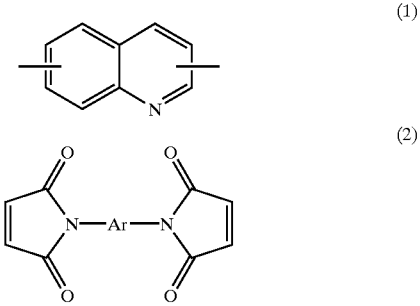

wherein Ar represents a divalent organic group containing at least two carbon atoms.

The second invention is a composition obtained by dissolving a resin composition comprising, as essential components, (A) a polymer containing a quinoline ring represented by the following formula (1) in the structure and (B) a bismaleimide compound represented by the following formula (2), and (C) a polymeric compound selected from an aromatic diamine, an epoxy compound and a polybutadiene compound, etc. in (D) an organic solvent.

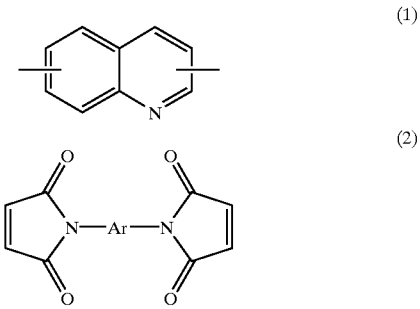

wherein Ar has the same meanings as defined above.

The third invention is a resin composition obtained by removing the organic solvent from the composition according to the second invention.

The fourth invention is a cured product obtained by heating and curing the resin composition of the third invention.

The fifth invention is, in either of the first to the third inventions, a resin composition which has a temperature region showing the value of a storage elastic modulus of from $10^7$ dyn/cm$^2$ to $10^2$ dyn/cm$^2$ at the temperature of 250° C. or lower, asaturation moisture absorption ratio of 1% or less, and thermal resistance at the atmosphere of 330° C. for 10 minutes or longer and an adhesive force with a material to be adhered of 0.6 kgf/cm or more.

The sixth invention is, in either of the first to the fifth inventions, a resin composition which comprises using, as the polymer containing a quinoline ring, a polymer containing a quinoline ring represented by the following formula (3) or (4).

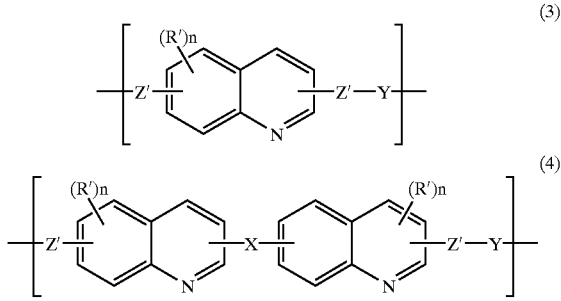

Here, in the formula (3) or the formula (4), R' each represents an alkyl group, an aryl group, an alkoxy group, an aryloxy group, a formyl group (—COR), an ester group (—COR or —OCOR), an amide group (—NRCOR or —CONRR), a heteroaryl group, a cyano group or a divalent hydrocarbon group which may contain an unsaturated bond formed by binding two groups (wherein R represents a hydrogen atom, an alkyl group or a heteroaryl group.), n is each independently an integer of 0 to 5, x represents a single bond, —O—, —S—, —CO—, —SO—, —SO$_2$—, —A—, the following formula (7) or —Q— (wherein q is an integer of 1 to 3, A represents —Ar—O—Ar— (where Ar represents an arylene group), —Hr— (where Hr represents a heteroarylene group), —CO—Ar—, —Ar—S—Ar—, —Ar—SO—Ar—, —Ar— or —Ar—Q—Ar—, Q represents $L_1$—C—$L_2$, and $L_1$ and $L_2$ each represents a methyl group, a trifluoromethyl group, or a divalent hydrocarbon group formed by combining $L_1$ and $L_2$ together with a carbon atoms to which they are bound, which may contain an unsaturated bond (s) or may be substituted by an unsaturated group(s).), Z' represents a single bond or an arylene group, and Y represents —O— or —O—A—O—.

The seventh invention is, in either of the first to the sixth inventions, a resin composition represented by a bismaleimide compound having the formula (5) or the formula (6) in the structure.

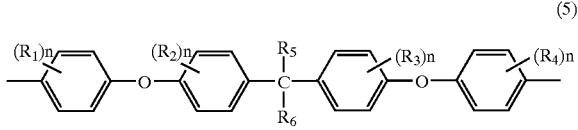

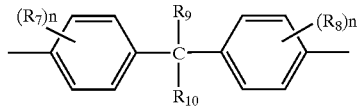

wherein $R_1$ to $R_{10}$ represent a hydrogen atom, $CH_3$, $C_2H_5$, $CF_3$ or $C_2F_5$, which may be the same or different from each other, and n is 0 or an integer of 1 to 4, which may be the same or different from each other.

The eighth invention is an adhesive film which comprises using the resin composition in the third, the fifth, the sixth or the seventh invention.

The ninth invention is, in the eighth invention, an adhesive film which comprises using at least one of the organic solvent selected from the group consisting of N-methyl-2-pyrrolidone, quinoline, cyclopentanone and m-cresol, as an organic solvent.

The tenth invention is, in the inventions of the eighth or the ninth invention, an adhesive film which comprises drying the film with the final drying temperature of 150° C. to 220° C. for removing the organic solvent.

BRIEF DESCRIPTION OF THE DRAWINGS

FIG. 3 is a diagram showing temperature dependency of the storage elastic modulus of the respective resin cured compositions of Example 17 and Comparative example 4, and in the figure, the reference numeral 10 shows the resin cured composition of Example 17, and 11 shows the resin cured composition of Comparative example 4, respectively.

BEST MODE FOR CARRYING OUT THE INVENTION

Figure 1:
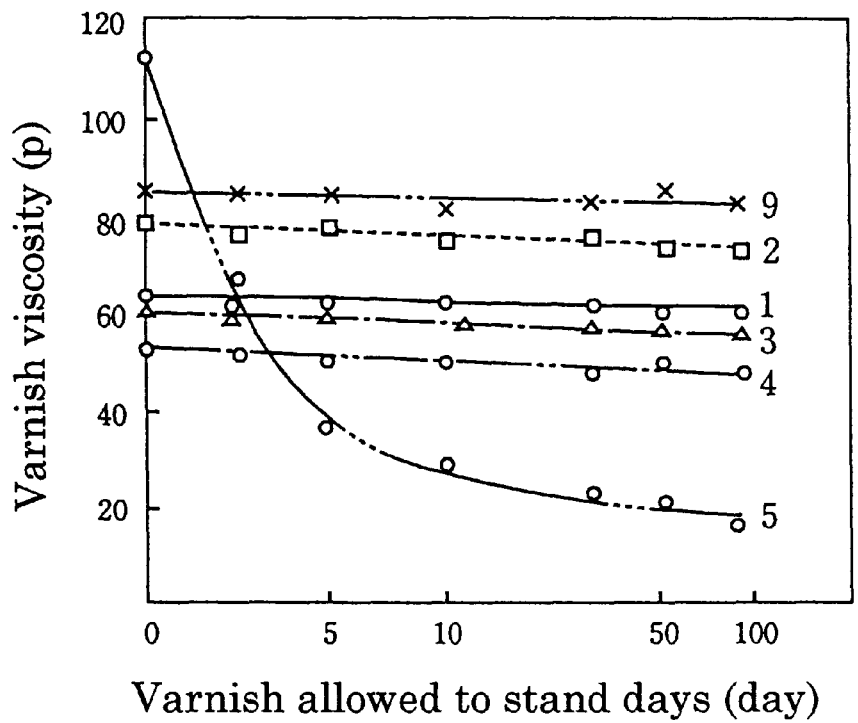
FIG. 1 shows a diagram showing the relationship between the viscosity of varnishes of Examples and Comparative example and lapsed days of the varnishes, and in the figure, the reference numeral 1 shows the varnish viscosity of Example 1, 2 shows the varnish viscosity of Example 3, 3 shows the varnish viscosity of Example 5, 4 shows the varnish viscosity of Example 10, 5 shows the varnish viscosity of Comparative example 1, and 9 shows the varnish viscosity of Example 12, respectively.

In the following, the present invention is explained in detail.

In the polymer containing a polyquinoline ring, for obtaining an adhesive force, moldability and high multi-layered constitution, it is indispensable to be melted during the molding process under heating and pressure to adhere to a material to be adhered, and further to be deformed. For obtaining such properties, the polymer may be used through an adhesive which melts in the molding process under heating and pressure, adheres to the material to be adhered and deforms. However, when such a constitution is employed, the resulting material is liable to receive an effect of the adhesive and excellent characteristics obtained by the polymer containing a polyquinoline ring such as a little water absorption ratio, excellent in stability at high temperatures and excellent in electric characteristics, etc. To solve the above problems, the present inventors have investigated about fluidized phenomenon during the curing process and have found that fluidity occurs by dissolving the polymer containing a polyquinoline ring which is caused by a fused thermosetting resin by heating.

From such a viewpoint, they have investigated about the combination of the bismaleimide compound represented by the formula (2) of the above-mentioned (B) and the polymer containing a polyquinoline ring. As a result, whereas the polymer containing a polyquinoline ring represented by the formula (1) of the above-mentioned (A) has an elasticity at 250° C. of $10^7$ dyn/cm$^2$ or more, it dissolves well in the fused bismaleimide compound represented by the formula (2) of the above-mentioned (B) whereby they have found that an elasticity is markedly lowered and it has a processing window.

Here, the term "processing window" means a temperature and time from softening the resin to curing the same in the curing procedure of the bismaleimide compound represented by the formula (2) in the above-mentioned (B). Those having a processing window is a material excellent in adhesiveness or molding property, and a resin having a processing window can be used as an insulating material for various uses.

Also, by adding (C) a polymeric compound selected from an aromatic diamine, an epoxy compound, a polybutadiene compound, etc., depending on the purpose of uses, in addition to (A) the polymer containing the polyquinoline ring represented by the above-mentioned formula (1) and (B) the bis-maleimide compound represented by the above-mentioned formula (2), mechanical characteristics of the resin composition, adhesive property with the material to be adhered, moldability, etc. can be more improved. Particularly, in these resin compositions, respective components are previously dissolved in (D) an organic solvent, a resin composition which is uniformly dissolved and excellent in characteristics can be obtained.

Next, in addition to (A) the polymer containing the polyquinoline ring represented by the above-mentioned formula (1) and (B) the bismaleimide compound represented by the above-mentioned formula (2), (C) the polymeric compound selected from an aromatic diamine, an epoxy compound, a polybutadiene compound, etc., depending on the purpose of uses is previously dissolved in (D) the organic solvent uniformly, and then, the organic solvent is removed to obtain a resin composition. The above-mentioned resin composition becomes a non-solvent type, and, for example, by making it in a film shape, it becomes a resin composition suitable for an insulating material such as an organic thin film multilayer wiring board for a multi-chip, a multilayer print wiring board, etc.

A resin composition which comprises a resin composition, in addition to (A) the polymer containing the polyquinoline ring represented by the above-mentioned formula (1) and (B) the bismaleimide compound represented by the above-mentioned formula (2), (C) the polymeric compound selected from an aromatic diamine, an epoxy compound, a polybutadiene compound, etc., depending on the purpose of uses is previously dissolved in (D) the organic solvent uniformly, and then, the organic solvent is removed has a temperature region showing the storage elastic modulus at a temperature of 250° C. or less of $10^7$ dyn/cm$^2$ to $10^2$ dyn/cm$^2$ so that it is excellent in moldability.

Also, it has saturated moisture absorption of 1% or less, is less affected by the volatile component at heating, and peeling and blister with the material to be adhered difficultly occur. Moreover, it has heat resistance at heated atmosphere of 330° C. of 10 minutes or more. For example, when it is used as an insulating layer which is required to have heat resistance such as a multi-chip module multilayer wiring board, etc., it can be applied to a product having a process which is carried out a heating step of a pin connecting temperature (330° C./10 minutes) when electronic parts are connected (300° C. to 330° C./5 minutes). Furthermore, it has an adhesive forth to the material to be adhered of 0.6 kgf/cm or more so that it is also excellent in the point of reliability. From the above viewpoints, the resin composition of the present invention is excellent in moldability, low moisture absorption, heat resistance and adhesiveness with the material to be adhered, whereby it becomes an insulating material excellent in uniformity against the required characteristics.

As a result of earnest studies on (A) the polymer containing the quinoline ring represented by the above-formula (I), the inventors have found that when (B) the polymer containing the quinoline ring and a bismaleimide compound having a structure of the above-mentioned formula (5) or (6), without mostly not impaired the characteristic feature of the polymer having the quinoline ring, (B) the bismaleimide compound having the structure of the above-mentioned formula (2) uniformly dissolves and flown whereby it is closely contacted with the material to be adhered so that excellent adhesive property can be obtained and a resin composition and an adhesive film both having excellent mechanical characteristics can be provided.

As (A) the polymer containing the quinoline ring to be used in the present invention, there may be mentioned, for example, a polymer containing a 2-(2-fluorophenyl)-5-fluoro-4-phenylquinoline unit, a polymer containing 2-(4-fluorophenyl)-5-fluoro-4-phenylquinoline unit, a polymer containing 4-(2-fluorophenyl)-5-fluoro-4-phenylquinoline unit, a polymer containing 2-(4-fluorophenyl)-7-fluoro-4-phenylquinoline unit, a polymer containing 2,4-difluoroquinoline unit, a polymer containing 1,5-difluoroquinoline unit, a polymer containing 2,7-difluoroquinoline unit, a polymer containing 2,7-difluoro-6-phenylquinoline unit, a polymer containing 4-(4-fluorophenyl)-7-fluoroquinoline unit, a polymer containing 6,6'-bis[2-(2-fluorophenyl)-4-phenylquinoline] unit, a polymer containing 6,6'-bis[2-(4-fluorophenyl)-4-phenylquinoline] unit, a polymer containing 6,6'-bis[2-(4-fluorophenyl)-4-tert-butylquinoline] unit, a polymer containing 6,6'-bis[4-(4-fluorophenyl)-2-phenylquinoline. unit, a polymer containing 6,6'-bis-2-fluoroquinoline unit, a polymer containing 6,6'-bis-4-fluoroquinoline unit, a polymer containing 6,6'-bis[4-(4-fluorophenyl)-2-(2-pyridyl)quinoline] unit, a polymer containing 6,6'-bis(4-(4-fluorophenyl)-2-(methyl)quinoline] unit, a polymer containing 6,6'-bis[2-fluoro-4-phenylquinoline]unit, a polymer containing oxy-6,6'-bis[2-(4-fluorophenyl)-4-phenylqiunoline] unit, a polymer containing 1,4-benzene-bis-2,2-[2-(4-fluorophenyl)quinoline] unit, a polymer containing 1,4-benzene-bis-2,2-(4-fluoroquinoline) unit, a polymer containing 1,4-benzene-bis-2,2-[4-(4-fluorophenyl)-quinoline unit, a polymer containing 1,1,1,3,3,3-hexafluoroisopropylidene-bis-[(4-phenoxy-4-phenyl)-2-(4-fluoroquinoline)] unit, and the like. These polymers may be used singly or in combination of two or more kinds.

As the (B) bismaleimide compound, there may be mentioned, for example, a bifunctional bismaleimide compound represented by N,N'-ethylenedimaleimide, N,N'-hexamethylenebismaleimide, N,N'-dodecamethylenebismaleimide, N,N'-m-xylylenebismaleimide, N,N'-p-xylylenebismaleimide, N,N'-1,3-bismethylenecyclohexanebismaleimide, N,N'-1,4-bismethylenecyclohexanebismaleimide, N,N'-2,4-tolylenebismaleimide, N,N'-2,6-tolylenebismaleimide, N,N'-3,3-diphenylmethanebismaleimide, N,N'-4,4-diphenylmethanebismaleimide, 3,3-diphenylsulfonebismaleimide, 4,4-diphenylsulfonebismaleimide, N,N'-4,4-diphenylsulfidebismaleimide, N,N'-p-benzophenonebismaleimide, N,N'-diphenylethanebismaleimide, N,N'-diphenyl ether bismaleimide, N,N'-(methylene-ditetrahydrophenyl)bismaleimide, N,N'-(3-ethyl)-4,4-diphenylmethanebismaleimide, N,N'-(3,3-dimethyl)-4,4-diphenylmethanebismaleimide, N,N'-(3,3-diethyl)-4,4-diphenylmethanebismaleimide, N,N'-(3,3-dichloro)-4,4-diphenylmethanebismaleimide, N,N'-tolidinebismaleimide, N,N'-isophoronebismaleimide, N,N'-p,p'-diphenyldimethylsilylbismaleimide, N,N'-benzophenonebismaleimide, N,N'-diphenylpropanebismaleimide, N,N'-naphthalenebismaleimide, N,N'-m-phenylenebismaleimide, N,N'-4,4-(1,1-diphenyl-cyclohexane)-bismaleimide, N,N'-3,5-(1,2,4-triazol)-bismaleimide, N,N'-pyridine-2,6-diylbismaleimide, N,N'-5-methoxy-1,3-phenylenebismaleimide, 1,2-bis(2-maleimidoethoxy)ethane, 1,3-bis(3-maleimidopropoxy)propane, N,N'-4,4-diphenylmethane-bis-dimethylmaleimide, N,N'-hexamethylene-bis-dimethylmaleimide, N,N'-4,4'-(diphenyl ether)-bis-dimethylmaleimide, N,N'-4,4'-(diphenylsulfone)-bis-dimethylmaleimide, N,N'-bismaleimide of N,N'-4,4'-(diamino)-triphenylphosphate or the like; a polyfunctional maleimide compound obtained by the reaction of a reaction product (a polyamine compound) of aniline and formalin, 3,4,4'-triaminodiphenylmethane, triaminophenol, etc., with maleic anhydride; a maleimide compound obtained by the reaction of tris-(4-aminophenyl)-phosphate, tris(4-aminophenyl)-phosphate, tris(4-aminophenyl)-thiophosphate with maleic anhydride; an aromatic bismaleimide compound such as 2,2-bis[4-(4-maleimidophenoxy)phenyl]propane, 2,2-bis[3-chloro-4-(4-maleimidophenoxy)phenyl]propane, 2,2-bis[3-bromo-4-(4-maleimidophenoxy)phenyl]propane, 2,2-bis[3-ethyl-4-(4-maleimidophenoxy)phenyl]propane, 2,2-bis[3-propyl-4-(4-maleimidophenoxy)phenyl]propane, 2,2-bis[3-isopropyl-4-(4-maleimidophenoxy)phenyl]propane, 2,2-bis[3-butyl-4-(4-maleimidophenoxy)phenyl]propane, 2,2-bis[3-sec-butyl-4-(4-maleimidophenoxy)phenyl]propane, 2,2-bis[3-methoxy-4-(4-maleimidophenoxy)phenyl]propane, 1,1-bis[4-(4-maleimidophenoxy)phenyl]ethane, 1,1-bis[3-methyl-4-(4-maleimidophenoxy)phenyl]ethane, 1,1-bis[3-chloro-4-(4-maleimidophenoxy)phenyl]ethane, 1,1-bis[3-bromo-4-(4-maleimidophenoxy)phenyl]ethane, 1,1-bis[4-(4-maleimidophenoxy)phenyl]methane, 1,1-bis[3-methyl-4-(4-maleimidophenoxy)phenyl]methane, 1,1-bis[3-chloro-4-(4-maleimidophenoxy)phenyl]methane, 1,1-bis[3-bromo-4-(4-maleimidophenoxy)phenyl]methane, 3,3-bis[4-(4-maleimidophenoxy)phenyl]pentane, 1,1-bis[4-(4-maleimidophenoxy)phenyl]propane, 1,1,1,3,3,3-hexafluoro-2,2-bis[4-(4-maleimidophenoxy)phenyl]propane, 1,1,1,3,3,3-hexafluoro-2,2-bis[3,5-dimethyl-(4-maleimidophenoxy)phenyl]propane, 1,1,1,3,3,3-hexafluoro-2,2-bis[3,5-dibromo-(4-maleimidophenoxy)phenyl]propane and 1,1,1,3,3,3-hexafluoro-2,2-bis[3- or 5-methyl-(4-maleimidophenoxy)phenyl]propane, etc., and the invention is not particularly limited by those as mentioned above. Moreover, it is possible to use the component singly or two or more kinds.

As an aromatic diamine among (C) the polymeric compound of the present invention, there may be mentioned, for example, m-phenylenediamine, p-phenylenediamine, 4,4-diaminodiphenylmethane, 4,4-diaminodiphenylsulfide, 2,2-bis(4-aminophenyl)propane, 4,4-diaminodiphenylsulfone, bis-(4-aminophenyl)methylphosphine oxide, bis-(4-aminophenyl)phosphine oxide, bis-(4-aminophenyl)methylamine, 1,5-diaminonaphthalene, m-xylylenediamine, 1,1-bis(p-aminophenyl)furan, p-xylylenediamine, 6,6-diamino-2,2-bipyridyl, 2,2-bis[3-propyl-4-(4-aminophenoxy)phenyl]propane, 2,2-bis[3-sec-butyl-4-(4-aminophenoxy)phenyl]propane, 2,2-bis[3-methoxy-4-(4-aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3-bromo-4-(4-aminophenoxy)phenyl]ethane, 1,1-bis[4-(4-aminophenoxy)phenyl]methane, 1,1-bis[3-methyl-4-(4-aminophenoxy)phenyl]methane, 1,1-bis[3-chloro-4-(4-aminophenoxy)phenyl]methane, 1,1-bis[3-bromo-4-(4-aminophenoxy)phenyl]methane, 3,3-bis[4-(4-aminophenoxy)phenyl]pentane, 1,1-bis[4-(4-aminophenoxy)phenyl]propane, 1,1,1,3,3,3-hexafluoro-2,2-bis[4-(4-aminophenoxy)phenyl]propane, 1,1,1,3,3,3-hexafluoro-2,2-bis[3,5-dimethyl-4-(4-aminophenoxy)phenyl] propane, 1,1,1,3,3,3-hexafluoro-2,2-bis[3,5-dibromo-4-(4-aminophenoxy)phenyl] propane, 1,1,1,3,3,3-hexafluoro-2,2-bis[3- or 5-methyl-4-(4-aminophenoxy)phenyl]propane, and the like, and not particularly limited to those as mentioned above. Incidentally, the reason why an aromatic series compound is used is that they are advantageous in the point of thermal resistance as compared with those of an aliphatic series compound.

As an epoxy compound among (C) the polymeric compound, there may be used, for example, at least one of a bifunctional epoxy compound such as diglycidyl ether of bisphenol A, 3,4-epoxycyclohexylmethyl-3,4-epoxycyclohexanecarboxylate, 4,4'-(1,2-epoxyethyl)biphenyl, 4,4'-(1,2-epoxyethyl)biphenyl ether, resorcinglycidyl ether, bis(2,3-epoxycyclopentyl) ether, N,N'-m-phenylenebis(4,5'-epoxy-1,2-cyclohexanedicarbodiimide), etc., an epoxy compound of trifunctional or more such as a triglycidyl compound of p-aminophenol, 1,3,5-tri(1,2-epoxyethyl)benzene, tetraglycidoxytetraphenylethane, phenolformaldehyde novolac resin, an epoxy compound having a hydrantoin skeleton, an epoxy compound containing a halogen atom such as a brominated epoxy compound, and the like.

As a polybutadiene compound among (C) the compound, there may be used, for example, at least one of 1,2-polybutadiene, cyclized 1,2-polybutadiene, epoxy-modified 1,2-polybutadiene, terminal epoxidized 1,2-polybutadiene, 1,2-polybutadiene glycol, 1,2-polybutadiene carboxylic acid, urethanemodified 1,2-polybutadiene, maleimidated 1,2-polybutadiene, terminal acryl-modified 1,2-polybutadiene, terminal estermodified 1,2-polybutadiene compound, and the like.

As (D) the organic solvent, there may be used at least one selected from, for example, methyl cellosolve, methyl ethyl ketone, N,N-dimethylformamide, N,N-dimethylacetamide, N-methyl-2-pyrrolidone, quinoline, cyclopentanone, m-cresol, chloroform, etc.

In the present invention, the formulation ratio of the polymer containing the quinoline ring of Component (A) and the bismaleimide compound of Component (B) is preferably 30% by weight to 99.9% by weight of the polymer containing the quinoline ring of Component (A) and 0.1% by weight to 70% by weight of the bismaleimide compound of Component (B). If the amount of the polymer containing the quinoline ring of Component (A) is made less than 30% by weight, fluidity is excellent but mechanical characteristics are poor so that desired film formation becomes difficult and there cause the problem that crack occurs at the insulating portion when making multilayer structure and the like.

In the present invention, the formulation ratio of the polymer containing the quinoline ring of Component (A) and the bismaleimide compound of Component (B) is more preferably 30% by weight to 70% by weight based on the total solid component which is the sum of the both components when the preparation of an adhesive film is intended by using the knife coating, the bar coating, etc. On the other hand, when preparation of a multi-layered layer insulation film with a low dielectric constant is intended by the spin coating method, etc., the amount of bismaleimide compound of Component (B) is desirably from 0.1 to 30% by weight, particularly preferably 5 to 30% by weight based on the total solid component which is the sum of the both components. If an amount of Component (B) is made 5% by weight or less, mechanical characteristics are excellent but solubility in a solvent becomes large so that cracks are sometimes generated at the insulating portion when a multi-layer structure is to be made.

Also, in the present invention, when the polymeric compound of Component (C) is to be added, an amount thereof is desirably 40% by weight or less based on the total resin component. When Component (C) is added in an amount of 40% by weight or more, whereas moldability and adhesiveness are excellent, it arises the problem that heat resistance is poor.

In the present invention, as the method for obtaining the resin composition comprising the polymer containing the quinoline ring of Component (A) and the bismaleimide compound of Component (B), or the resin composition comprising the polymer containing the quinoline ring of Component (A), the bismaleimide compound of Component (B) and the polymeric compound of Component (C), there may be mentioned the method in which the bismaleimide compound of Component (B) and the polymeric compound of Component (C) are previously melted by heating, then, the polymer containing the quinoline ring of Component (A) is added thereto to mix uniformly, and thereafter the composition is cured to obtain the resin composition. However, in general, suitable is the method in which the polymer containing the quinoline ring of Component (A), the bismaleimide compound of Component (B) and the polymeric compound of Component (C) are uniformly mixed in the organic solvent (D) to obtain the composition as a varnish. Moreover, it is possible to make a film by removing the solvent from the varnish.

The adhesive film in the present invention can be obtained, for example, by flow casting or coating the above-mentioned varnish on a substrate film such as a polyamide or a polyester, etc. with a certain thickness, and after drying between 100° C. and 250° C., peeling from the substrate.

In the above-mentioned procedure, it is particularly important to select the kind of the solvent to be used and the final drying temperature at the time of removing the solvent. As the above-mentioned solvent, there may be used a kind selected from the group consisting of methyl cellosolve, methyl ethyl ketone, N,N-dimethylformamide, N,N-dimethylacetamide, N-methyl-2-pyrrolidone, quinoline, cyclopentanone, m-cresol and chloroform, etc., or a mixed solvent of the above solvents. It is preferred to use N-methyl-2-pyrrolidone, cyclopentanone and/or m-cresol so that the resin composition is to be sufficiently dissolved and sufficiently removed by drying, and by the same reason, it is more preferred to use N-methyl-2-pyrrolidone and/or cyclopentanone. Moreover, it is particularly preferred to use cyclopentanone in the points that it is difficultly moisture absorbed and the film is difficultly blushed.

The final drying temperature is preferably within the range between 100° C. and 250° C. If it is less than 100° C., the solvent can hardly removed sufficiently while if it exceeds 250° C., Component (B) is thermoset whereby fluidity at the time of adhesion is easily lowered. By the same reason, the drying temperature is preferably 150° C. to 220° C., more preferably 160° C. to 200° C., particularly preferably 160° C. to 180° C.

According to the above solvent and the drying temperature, an adhesive film having a sufficiently less amount of the residual solvent and excellent in fluidity at the time of adhesion can be obtained. After adhering the adhesive film to a material to be adhered under heating and pressure, it is thermoset at 200° C. or more, preferably 250° C. or more, more preferably 280° C. or more, a cured layer having a less moisture absorption ratio, excellent in mechanical characteristics, adhesiveness with a material to be adhered, and heat resistance can be formed. Also, at this time, adhesion under heating and pressure, and thermosetting can be carried out simultaneously.

The thickness of the adhesive film is not particularly limited, but to sufficiently heighten insulating property, the thickness of the adhesive film is preferably 1 μm or more, and to make sufficiently thin the thickness of the layered material when it is laminated, it is preferably 100 μm or less. By the same reason, the thickness of the adhesive film is preferably 5 to 50 μm, particularly preferably 15 to 30 μm.

Also, the thickness of the multi-layered layer insulation film is not particularly limited, but by the reason to easily get a smooth coating film, it is preferably 0.1 to 3 μm, more preferably 0.1 to 1 μm.

In the resin composition of the present invention, it is also possible to add an organic peroxide or a reaction promoter, etc., if necessary, for the purpose of low temperature curing or curing within a short period of time.

EXAMPLES

Example 1

Synthesis of Polyquinoline

To a one-liter stainless flask were added 74.3 g (0.124 mole, 1.03 equivalents) of 6,6'-bis(2-(4-fluorophenyl)-4-phenylquinoline), 40.6 g (0.121 mole, 1.00 equivalent) of 4,4'-(1,1,1,3,3,3-hexafluoro-2,2-propyliden)bisphenol and 25 g (0.181 mole, 1.5 equivalents) of anhydrous potassium carbonate, and 450 ml of N-methyl-2-pyrrolidone and 90 ml of toluene were added as solvents. To the flask were provided a water-cooling system cooling tube to which a calcium chloride tube and a Dean-Stark tube for removing water had been attached, a dry nitrogen inlet tube, a mechanical stirrer and a thermometer. By using an oil bath, the mixture was refluxed under heating for 24 hours, and water in the system was removed by azeotropic distillation with toluene for 24 hours. The solution was firstly yellowish, then gradually changed to dark brown and became black at this stage. The reaction temperature was further raised up to 200° C. and the mixture was reacted for 6 hours. The reaction solution changed from black to deep blue accompanying with increase in viscosity. By adding 650 ml of N-methyl-2-pyrrolidone to the mixture to dilute and cool the same, thereactionwasstopped. Topurifytheresultingpolymer solution, the resulting solution was thrown into water to form a precipitate. Further, the precipitate was stirred in water at 50° C. for 2 hours to purify the same, and the procedure was repeated three times. Thereafter, the polymer was collected by filtration and dried a day and night by a vacuum drier at 60° C. The yield of the polymer: 101.1 g (89.0%).

Next, after setting a stirring rod, a cooling tube and a thermometer to a 500 ml-volume three-necked flask, 60 g of the above-mentioned polymer and 280 g of cyclopentanone were charged therein, and the materials were dissolved by stirring at room temperature for one hour. Moreover, 60 g of 2,2-bis((4-maleimidophenoxy)phenyl)propane was added to the mixture and the resulting mixture was stirred for one hour to obtain the desired varnish. Changes with a lapse of time of the resulting varnish when it was stored at room temperature (20° C. to 23° C.) were measured by using an E-type viscometer VISCONIC type (available from Tokyo Seimitsu Co.). The results are shown in FIG. 1.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. The resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermo-balance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 2

By using 50 g of the varnish obtained in Example 1, 0.01 g of 2,5-dimethyl-2,5-di(tert-butylperoxy)hexyne-3 (perhexyne 2,5B, trade name, available from Nippon Oil & Fats Co.) was added to the varnish and uniformly dissolved.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 3

By using 100 g of the varnish obtained in Example 1, 6 g of epoxy-modified polybutadiene modified by diglycidyl ether bisphenol A and 0.42 g of 4,4-diaminodiphenylmethane were added to the varnish and uniformly dissolved to obtain a varnish. Changes of the resulting varnish with a lapse of time when it was stored at room temperature (20° C. to 23° C.) were measured by using an E-type viscometer VISCONIC type (trade name, available from Tokyo Seimitsu). The results are shown in FIG. 1.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 4

15 g of the polymer obtained in Example 1 was charged in a 200 ml-volume three-necked flask equipped with a stirring rod, a cooling tube and a thermometer, and 70 g of cyclopentanone was added thereto and the mixture was dissolved by stirring at room temperature for one hour. Next, 15 g of 2,2-bis(4-(2-trifluoromethyl-4-maleimidophenoxy)phenyl)-1,1,1,3,3,3-hexafluoropropane was added to the mixture and the resulting mixture was stirred for one hour to obtain the desired varnish.

Next, apolyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 5

In a two-liter round flask equipped with a mechanical stirrer, a Dean-Stark tube having a condenser and a nitrogen inlet tube, and a thermometer were charged 114.75 g (0.1925 mole, 1.03 equivalents) of 6,6-bis(2-(4-fluorophenyl)-4-phenylquinoline), 66.0472 g (0.18848 mole, 1.00 equivalent) of 9,9-bis(4-hydroxyphenyl)fluorene, 705 ml of N-methyl-2-pyrrolidone and 421 ml of toluene. The reaction mixture was heated under nitrogen atmosphere for 15 hours. Toluene was removed by the Dean-Stark tube and the reaction mixture was further heated at 200° C. for 12 hours. The reaction mixture was diluted by N-methyl-2-pyrrolidone and cooled to room temperature. By gradually pouring the resulting polymer solution to a 3-times volume of acetone, the polymer material was condensed. The polymer material was collected by filtration, dissolved in N-methyl-2-pyrrolidone and diluted by a 3-times volume of water. The yield of the polymer was 170 g (99%).

Next, after setting a stirring rod, a cooling tube and a thermometer to a 500 ml-volume three-necked flask, 60 g of the above-mentioned polymer and 280 g of m-cresol were charged therein, and the materials were dissolved by stirring at room temperature for one hour. Moreover, 60 g of bis(4-maleimidophenyl)methane was added to the mixture and the resulting mixture was stirred for one hour to obtain the desired varnish. Changes with a lapse of time of the resulting varnish when it was stored at room temperature (20° C. to 23° C.) were measured by using an E-type viscometer VISCONIC type (trade name, available from Tokyo Seimitsu Co.). The results are shown in FIG. 1.

Figure 2:
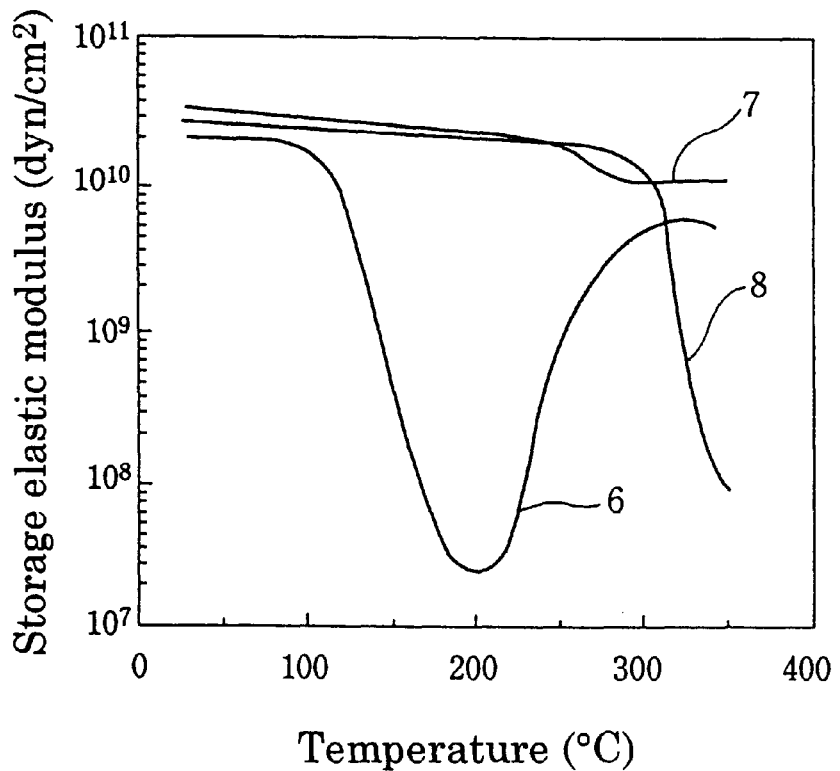
FIG. 2 shows a diagram showing the relationship of storage elastic modulus when heating films heated and dried of Examples and Comparative example, and in the figure, the reference numeral 6 shows the storage elastic modulus of the film in Example 5 in which it is dried at 100° C. for 20 minutes and 200° C. for 20 minutes, 7 shows the storage elastic modulus of the film in Example 5 in which it is dried at 250° C. for 60 minutes, and 8 shows the storage elastic modulus of the film in Comparative example 2 in which it is dried at 100° C. for 20 minutes and 200° C. for 20 minutes, respectively.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. The resulting varnish was uniformly coated by using a bar coater, and dried by heating at 100° C. for 20 minutes and at 200° C. for 20 minutes to obtain three sheets of the films each having a thickness of about 0.030 mm from which m-cresol was removed. By using the above-mentioned film, storage elastic modulus was measured with a tensile mode by using a viscoelastic measurement device Type DVA-200 (tradename, available from IT Keisoku Seigyo Co.). The result is shown in FIG. 2. The storage elastic modulus of this film gradually lowers as the temperature raises as shown in FIG. 2, but it maintains a high value even when the temperature is raised over 300° C.

Next, one of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 6

By using 50 g of the varnish obtained in Example 5, 0.01 g of 2,5-dimethyl-2,5-di(tert-butylperoxy)hexyne-3

(perhexyne 2,5B, trade name, available from Nippon Oil & Fats Co.) was added to the varnish and uniformly dissolved.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which m-cresol was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was gevaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 7

By using 100 g of the varnish obtained in Example 5, 6 g of epoxy-modified polybutadiene modified by diglycidyl ether bisphenol A and 0.42 g of 4,4-diaminodiphenylmethane were added to the varnish and uniformly dissolved to obtain a varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which m-cresol was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 8

15 g of the polymer obtained in Example 5 was charged in a 200 ml-volume three-necked flask equipped with a stirring rod, a cooling tube and a thermometer, and 70 g of cyclopentanone was added thereto and the mixture was dissolved by stirring at 35 room temperature for one hour. Next, 15 g of 2,2-bis(4-(4-maleimidophenoxy)phenyl) propane was added to the mixture and the resulting mixture was stirred for one hour to obtain the desired varnish.

Next, apolyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which m-cresol was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 9

To a one-liter stainless flask were added 74.3 g (0.124 mole, 1.03 equivalents) of 6,6'-bis(2-(4-fluorophenyl)-4-phenylquinoline), 27.6 g (0.121 mole, 1.00 equivalent) of methyl-2,4-dihydroxybenzoate, isopropylidene diphenol and 25 g (0.181 mole, 1.5 equivalents) of anhydrous potassium carbonate, and 450 ml of N-methyl-2-pyrrolidone and 9b ml of toluene were added as solvents. To the flask were provided a water-cooling system cooling tube to which a calcium chloride tube and a Dean-Stark tube for removing water had been attached, a dry nitrogen inlet tube, a mechanical stirrer and a thermometer. By using an oil bath, the mixture was refluxed under heating for 24 hours, and water in the system was removed by azeotropic distillation with toluene for 24 hours. The solution was firstly yellowish, then gradually changed to dark brown and became black at this stage. The reaction temperature was further raised up to 200° C. and the mixture was reacted for 6 hours. The reaction solution changed from black to deep blue accompanying with increase in viscosity. By adding 650 ml of N-methyl-2-pyrrolidone to the mixture to dilute and cool the same, the reaction was stopped. To purify the resulting polymer solution, the resulting solution was thrown into water to form a precipitate. Further, the precipitate was stirred in water at 50° C. for 2 hours to purify the same, and the procedure was repeated three times. Thereafter, the polymer was collected by filtration and dried a day and night by a vacuum drier at 60° C. The yield of the polymer was 84.0 g (87%).

15 g of the resulting polymer was charged in a 200 ml-volume three-necked flask equipped with a stirring rod, a cooling tube and a thermometer, and 70 g of cyclopentanone was further added thereto and the mixture was dissolved by stirring at room temperature for one hour. Next, 15 g of 2,2-bis-(4-(4-maleimidophenoxy)phenyl)-1,1,1,3,3,3-hexafluoroprane was added to the mixture and the resulting mixture was stirred for one hour to obtain the desired varnish.

Next, apolyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. The resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 10

To a one-liter stainless flask were provided a water-cooling system cooling tube to which a calcium chloride tube and a Dean-Stark tube for removing water had been attached, a dry nitrogen inlet tube, a mechanical stirrer and a thermometer, and 400 ml of m-cresol as a solvent and 340 g of phosphorus pentoxide as a catalyst were charged therein and the mixture was heated to 140° C. under nitrogen stream while stirring and reacted for 3 hours to prepare a polymerizationsolvent. After cooling to room temperature, 95.71 g (0.4 mole) of 5-acetyl-2-aminobenzophenone recrystallized from ethanol was added to the solvent, and the mixture was heated to 120° C. under nitrogen stream while stirring and the reaction was carried out for 48 hours. After completion of the reaction, the reaction mixtture was poured into a large amount of a 10%-triethylamine ethanol solution to stop the reaction whereby the polymer was isolated. The polymer was washed with ethanol, and ethanol was removed by a Soxhlet's extractor and dried at 100° C. The yield of the polymer was 93.7 g (98%).

15 g of the resulting varnish was charged in a 200 ml-volume three-necked flask equipped with a stirring rod, a cooling tube and a thermometer, and 100 g of chloroform was further added thereto and the mixture was dissolved by stirring at room temperature for one hour. Next, 15 g of 2,2-bis-((4-maleimidophenoxy)phenyl)propane was added to the mixture and the resulting mixture was stirred for one hour to obtain the desired varnish. Changes with a lapse of time of the resulting varnish when it was stored at room temperature (20° C. to 23° C.) were measured by using an E-type viscometer VISCONIC type (trade name, available from Tokyo Seimitsu Co.). The results are shown in FIG. 1.

Next, apolyimide film (UPILEX-25S, tradename, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which chloroform was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 11

To a one-liter stainless flask were provided a water-cooling system cooling tube to which a calcium chloride tube and a Dean-Stark tube for removing water had been attached, a dry nitrogen inlet tube, a mechanical stirrer and a thermometer, and 400 ml of m-cresol as a solvent and 340 g of phosphorus pentoxide as a catalyst were charged therein and the mixture was heated to 140° C. under nitrogen stream while stirring and reacted for 3 hours to prepare a polymerization solvent. After cooling to room temperature, 95.71 g (0.4 mole) of 5-acetyl-2-aminobenzophenone recrystallized from ethanol was added to the solvent, and the mixture was heated to 120° C. under nitrogen stream while stirring and the reaction was carried out for 48 hours. After completion of the reaction, the reaction solvent was poured into a large amount of a triethylamine 10% ethanol solution to stop the reaction whereby the polymer was isolated. The polymer was washed with ethanol, and ethanol was removed by a Soxhlet's extractor and dried at 100C. The yield of the polymer was 93.7 g (98%).

15 g of the resulting polymer was charged in a 200 ml-volume three-necked flask equipped with a stirring rod, a cooling tube and a thermometer, and 100 g of chloroform was further added thereto and the mixture was dissolved by stirring at room temperature for one hour. Next, 15 g of 2,2-bis(4-(4-maleimidophenoxy)phenyl)-1,1,1,3,3,3-hexafluoropropane was added to the mixture and the resulting mixture was stirred for one hour to obtain the desired varnish.

Next, apolyimide film (UPILEX-25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which chloroform was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Example 12

18 g of the polymer obtained in Example 1 was charged in a 200 ml-volume three-necked flask equipped with a stirring rod, a cooling tube and a thermometer, and 70 g of cyclopentanone was added thereto and the mixture was dissolved by stirring at room temperature for one hour. Next, 12 g of 2,2-bis(4-(2-trifluoromethyl-4-maleimidophenoxy) phenyl)-1,1,1,3,3,3-hexafluoropropane was added to the mixture and the resulting mixture was stirred for one hour to obtain the desired varnish. Changes with a lapse of time of the resulting varnish when it was stored at room temperature (20° C. to 23° C.) were measured by using an E-type viscometer VISCONIC type (trade name, available from Tokyo Seimitsu Co.). The results are shown in FIG. 1.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which chloroform was removed. One of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Comparative Example 1

After setting a stirring rod, a cooling tube and a thermometer to a one-liter three-necked flask with a stirrer, 41.0 g of 2,2-bis((4-diaminophenoxy)phenyl)propane was charged therein and dissolved by adding 415 ml of N-methyl-2-pyrrolidone. Next, while cooling with ice water, 3,3,4,4-benzophenonetetracarboxylic acid dianhydride was dissolved with a small amount and reacted for 4 hours to obtain a polyamic acid varnish. Further, after setting a stirring rod, a cooling tube and a thermometer to a 200 ml-volume three-necked flask, 100 g of the resulting varnish was charged therein, 10 g of bis(4-maleimidophenyl)methane was added thereto and the resulting mixture was stirred for 30 minutes to obtain the desired varnish. Changes with a lapse of time of the resulting varnish when it was stored at room temperature (20° C. to 23° C.) were measured by using an E-type viscometer VISCONIC type (trade name, available from Tokyo Seimitsu Co.). The results are shown in FIG. 1.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which N-methyl-2-pyrrolidone was removed. One of the resulting films was cured by heating in a press to obtain acured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

Comparative Example 2

After setting a stirring rod, a cooling tube and a thermometer to a 200 ml-volume three-necked flask, 15 g of the polymer obtained in Example 5 and 80 g of m-cresol were charged therein and the mixture was dissolved by stirring at room temperature for one hour to obtain the desired varnish. Changes with a lapse of time of the resulting varnish when it was stored at room temperature (20° C. to 23° C.) were measured by using an E-type viscometer VISCONIC type (trade name, available from Tokyo Seimitsu Co.). The results are shown in FIG. 2.

Next, a polyimide film (UPILEX 25S, trade name, available from UBE INDUSTRIES, LTD.) having a thickness of 0.025 mm was adhered to Pyrex glass plate with a size of 200 mm×200 mm×2 (mm) by using a heat-resistant tape. Further, the resulting varnish was uniformly coated by using a bar coater, and dried by heating at 100° C. for 20 minutes and at 200° C. for 20 minutes to obtain three sheets of the films each having a thickness of about 0.030 mm from which m-cresol was removed. By using the above-mentioned film, storage elastic modulus was measuredwith a tensile mode by using a viscoelastic measurement device Type DVA-200 (trade name, available from IT Keisoku Seigyo Co.). The result is shown in FIG. 1.

Next, one of the resulting films was cured by heating in a press to obtain a cured resin composition. By using the above-mentioned cured resin composition, a relative dielectric constant at 1 kHz, dielectric loss factor (tan δ), breaking strain, and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 1 and Table 2.

TABLE 1

| Measurement conditions | Curing | relative dielectric constant | Dielectric loss factor Room temper- | Tensile strength Room Temperature Rate: 5 mm/min | Breaking strain |
| --- | --- | --- | --- | --- | --- |
| Unit | conditions | 1 kHz | ature | kg/mm² | % |
| Example 1 | 270° C./90 min | 2.8 | 0.0012 | 12 | 8 |
| Example 2 | 250° C./90 min | 2.8 | 0.0013 | 11 | 7 |
| Example 3 | 230° C./60 min | 2.9 | 0.0023 | 12 | 13 |
| Example 4 | 270° C./90 min | 2.6 | 0.0010 | 10 | 9 |
| Example 5 | 270° C./90 min | 3.0 | 0.0014 | 12 | 9 |
| Example 6 | 250° C./60 min | 3.0 | 0.0013 | 13 | 11 |
| Example 7 | 250° C./60 min | 3.0 | 0.0023 | 11 | 14 |
| Example 8 | 270° C./90 min | 2.8 | 0.0013 | 10 | 10 |
| Example 9 | 270° C./90 min | 2.9 | 0.0015 | 11 | 9 |
| Example 10 | 270° C./90 min | 2.8 | 0.0012 | 12 | 10 |
| Example 11 | 250° C./90 min | 2.9 | 0.0014 | 10 | 9 |
| Example 12 | 300° C./60 min | 2.8 | 0.0012 | 12 | 8 |
| Comparative example 1 | 250° C./90 min | 3.5 | 0.0017 | 11 | 6 |
| Comparative example 2 | 270° C./90 min | 2.6 | 0.0012 | 12 | 13 |

TABLE 2

| Measured conditions Unit | Thermal decomposition temperature Temperature raising: 5° C./min: 100 ml/min 3% amount decreased value ° C. | Solder heat resistance Presence or absence of blister of the value at 330° C. after 10 min | Adhesion strength Adhesive force with copper at room temperature kgf/cm | Flowability Flowability at curing by heating*1 |
| --- | --- | --- | --- | --- |
| Example 1 | 480 | None | 1.2 | ○ |
| Example 2 | 486 | None | 1.1 | ○ |
| Example 3 | 385 | None | 1.6 | ○ |
| Example 4 | 472 | None | 1.2 | ○ |
| Example 5 | 488 | None | 1.2 | ○ |
| Example 6 | 482 | None | 1.1 | ○ |
| Example 7 | 380 | None | 1.5 | ○ |
| Example 8 | 475 | None | 1.2 | ○ |

TABLE 2-continued

| Measured conditions Unit | Thermal decomposition temperature Temperature raising: 5° C./min: 100 ml/min 3% amount decreased value ° C. | Solder heat resistance Presence or absence of blister of the value at 330° C. after 10 min | Adhesion strength Adhesive force with copper at room temperature kgf/cm | Flowability Flowability at curing by heating*1 |
|---|---|---|---|---|
| Example 9 | 442 | None | 1.1 | ○ |
| Example 10 | 434 | None | 1.2 | ○ |
| Example 11 | 429 | None | 1.3 | ○ |
| Example 12 | 486 | None | 1.3 | ⊚ |
| Comparative example 1 | 469 | Present | 0.9 | Δ |
| Comparative example 2 | 488 | None | 0.3 | X |

*1 ⊚: Flowability is extremely good
○: Flowability is good
Δ: Flowability is bad
X: Flowability is significantly bad Example 13

Synthesis of Polyquinoline

To a one-liter stainless flask were added 74.3 g (0.124 mole, 1.03 equivalents) of 6,6'-bis(2-(4-fluorophenyl)-4-phenylquinoline), 40.6 g (0.121 mole, 1.00 equivalent) of 4,4'-(1,1,1,3,3,3-hexafluoro-2,2-propyliden)bisphenol and 25 g (0.181 mole, 1.5 equivalents) of anhydrous potassium carbonate, and 450 ml of N-methyl-2-pyrrolidone and 90 ml of toluene were added as solvents. To the flask were provided a water-cooling system cooling tube to which a calcium chloride tube and a Dean-Stark tube for removing water had been attached, a dry nitrogen inlet tube, a mechanical stirrer and a thermometer. By using an oil bath, the mixture was refluxed under heating for 24 hours, and water in the system was removed by azeotropic distillation with toluene for 24 hours. The solution was firstly yellowish, then gradually changed to dark brown and became black at this stage. The reaction temperature was further raised up to 200° C. and the mixture was reacted for 6 hours. The reaction solution changed from black to deep blue accompanying with increase in viscosity. By adding 650 ml of N-methyl-2-pyrrolidone to the mixture to dilute and cool the same, the reaction was stopped. To purify the resulting polymer solution, the resulting solution was thrown into water to form a precipitate. Further, the precipitate was stirred in water at 50° C. for 2 hours to purify the same, and the procedure was repeated three times. Thereafter, the polymer was collected by filtration and dried a day and night by a vacuum drier at 60° C. The yield of the polymer: 101.1 g (89.0%).

Next, after setting a stirring rod, a cooling tube and a thermometer to a 500 ml-volume three-necked flask, 108 g of the above-mentioned polymer and 280 g of cyclopentanone were charged therein, and the materials were dissolved by stirring at room temperature for one hour. Moreover, 12 g of 2,2-bis((4-maleimidophenoxy)phenyl) propane was added to the mixture and the resulting mixture was stirred forgone hour to obtain the desired varnish. A polyimide film (UPILEX-25S, trade name, available from UBE INDUSTRIES, LTD.) having a thickness of 0.025 mm was adhered to Pyrex glass plate with a size of 200 mm×200 mm×2 mm by using a heat-resistant tape. The resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 14

By using 50 g of the varnish obtained in Example 13, 0.01 g of 2,5-dimethyl-2,5-di(tert-butylperoxy)hexyne-3 (perhexyne 2,5B, trade name, available from Nippon Oil & Fats Co.) was added to the varnish and uniformly dissolved. A polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 15

By using 100 g of the varnish obtained in Example 13, 6 g of epoxy-modified polybutadiene modified by diglycidyl ether bisphenol A and 0.42 g of 4,4-diaminodiphenylmethane were added to the varnish and uniformly dissolved. A polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 16

45 g of the polymer obtained in Example 13 was charged in a 200 ml-volume three-necked flask equipped with a stirring rod, a cooling tube and a thermometer, and 70 g of cyclopentanone was added thereto and the mixture was dissolved by stirring at room temperature for one hour. Next, 5 g of 2,2-bis(4-(2-trifluoromethyl-4-maleimidophenoxy)phenyl)-1,1,1,3,3,3-hexafluoropropane was added to the mixture and the resulting mixture was stirred for one hour to obtain the desired varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 17

In a two-liter round flask equipped with a mechanical stirrer, a Dean-Stark tube having a condenser and a nitrogen inlet tube, and a thermometer were charged 114.75 g (0.1925 mole, 1.03 equivalents) of 6,6-bis(2-(4-fluorophenyl)-4-phenylquinoline), 66.0472 g (0.18848 mole, 1.00 equivalent) of 9,9-bis(4-hydroxyphenyl)fluorene, 705 ml of N-methyl-2-pyrrolidone and 421 ml of toluene. The reaction mixture was heated under nitrogen atmosphere for 15 hours. Toluene was removed by the Dean-Stark tube and the reaction mixture was further heated at 200° C. for 12 hours. The reaction mixture was diluted by N-methyl-2-pyrrolidone and cooled to room temperature. By gradually pouring the resulting polymer solution to a 3-times volume of acetone, the polymer material was condensed. The polymer material was collected by filtration, dissolved in N-methyl-2-pyrrolidone and diluted by a 3-times volume of water. The yield of the polymer was 170 g (99%).

Next, after setting a stirring rod, a cooling tube and a thermometer to a 500 ml-volume three-necked flask, 96 g of the above-mentioned polymer and 280 g of cyclopentanone were charged therein, and the materials were dissolved by stirring at room temperature for one hour. Moreover, 24 g of bis(4-maleimidophenyl)methane was added to the mixture and the resulting mixture was stirred for one hour to obtain the desired varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. The resulting varnish was uniformly coated by using a bar coater, and dried by heating at 100° C. for 20 minutes and at 200° C. for 20 minutes to obtain three sheets of the films each having a thickness of about 0.030 mm from which cyclopentanone was removed. By using the above-mentioned film, storage elastic modulus was measured with a tensile mode by using a viscoelastic measurement device Type DVA-200 (trade name, available from IT Keisoku Seigyo Co.). The result is shown in FIG. 3. The storage elastic modulus of this film gradually lowers as the temperature raises as shown in FIG. 3, but it maintains a high value even when the temperature is raised over 300° C.

Next, one of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 18

By using 50 g of the varnish obtained in Example 17, 0.01 g of 2,5-dimethyl-2,5-di(tert-butylperoxy)hexyne-3 (perhexyne 2,5B, trade name, available from Nippon Oil & Fats Co.) was added to the varnish and uniformly dissolved.

Next, a polyimide film (UPILEX 25S, trade name, available from UBE INDUSTRIES, LTD.) having a thickness of 0.025 mm was adhered to Pyrex glass plate with a size of 200×200×2 (mm) by using a heat-resistant tape. Further, there sulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 19

By using 100 g of the varnish obtained in Example 17, 6 g of epoxy-modified polybutadiene modified by diglycidyl ether bisphenol A and 0.42 g of 4,4-diaminodiphenylmethane were added to the varnish and uniformly dissolved to obtain a varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 20

24 g of the polymer obtained in Example 17 was charged in a 200 ml-volume three-necked flask equipped with a stirring rod, a cooling tube and a thermometer, and 70 g of cyclopentanone was added thereto and the mixture was dissolved by stirring at room temperature for one hour. Next, 6 g of 2,2-bis(4-(4-maleimidophenoxy)phenyl)propane was added to the mixture and the resulting mixture was stirred for one hour to obtain the desired varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 21

To a one-liter stainless flask were added 74.3 g (0.124 mole, 1.03 equivalents) of 6,6'-bis(2-(4-fluorophenyl)-4-phenylquinoline), 27.6 g (0.121 mole, 1.00 equivalent) of methyl-2,4-dihydroxybenzoate, isopropylidene diphenol and 25 g (0.181 mole, 1.5 equivalents) of anhydrous potassium carbonate, and 450 ml of N-methyl-2-pyrrolidone and 90 ml of toluene were added as solvents. To the flask were provided a water-cooling system cooling tube to which a calcium chloride tube and a Dean-Stark tube for removing water had been attached, a dry nitrogen inlet tube, a mechanical stirrer and a thermometer. By using an oil bath, the mixture was refluxed under heating for 24 hours, and water in the system was removed by azeotropic distillation with toluene for 24 hours. The solution was firstly yellowish, then gradually changed to dark brown and became black at this stage. The reaction temperature was further raised up to 200° C. and the mixture was reacted for 6 hours. The reaction solution changed from black to deep blue accompanying with increase in viscosity. By adding 650 ml of N-methyl-2-pyrrolidone to the mixture to dilute and cool the same, the reaction was stopped. To purify the resulting polymer solution, the resulting solution was thrown into water to form a precipitate. Further, the precipitate was stirred in water at 50° C. for 2 hours to purify the same, and the procedure was repeated three times. Thereafter, the polymer was collected by filtration and dried a day and night by a vacuum drier at 60° C. The yield of the polymer was 84.0 g (87%).

29.7 g of the resulting varnish was charged in a 200 ml-volume three-necked flask equipped with a stirring rod, a cooling tube and a thermometer, and 70 g of cyclopentanone was further added thereto and the mixture was dissolved by stirring at room temperature for one hour. Next, 0.3 g of 2,2-bis-(4-(4-maleimidophenoxy)phenyl)-1,1,1,3,3,3-hexafluoropropane was added to the mixture and the resulting mixture was stirred for one hour to obtain the desired varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. The resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 22

To a one-liter stainless flask were provided a water-cooling system cooling tube to which a calcium chloride tube and a Dean-Stark tube for removing water had been attached, a dry nitrogen inlet tube, a mechanical stirrer and a thermometer, and 400 ml of m-cresol as a solvent and 340 g of phosphorus pentoxide as a catalyst were charged therein and the mixture was heated to 140° C. under nitrogen stream while stirring and reacted for 3 hours to prepare a polymerization solvent. After cooling to room temperature, 95.71 g (0.4 mole) of 5-acetyl-2-aminobenzophenone recrystallized from ethanol was added to the solvent, and the mixture was heated to 120° C. under nitrogen stream while stirring and the reaction was carried out for 48 hours. After completion of the reaction, the reaction solvent was poured into a large amount of a 10%-triethylamine ethanol solution to stop the reaction whereby the polymer was isolated. The polymer was washed with ethanol, and ethanol was removed by a Soxhlet's extractor and dried at 100° C. The yield of the polymer was 93.7 g (98%).

24 g of the resulting polymer was charged in a 200 ml-volume three-necked flask equipped with a stirring rod, a cooling tube and a thermometer, and 100 g of chloroform was further added thereto and the mixture was dissolved by stirring at room temperature for one hour. Next, 6 g of 2,2-bis((4-maleimidophenoxy)phenyl)propane was added to the mixture and the resulting mixture was stirred for one hour to obtain the desired varnish.

Next, apolyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which cyclopentanone was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Example 23

24 g of the polymer obtained in Example 22 was charged in a 200 ml-volume three-necked flask equipped with a stirring rod, a cooling tube and a thermometer, and 100 g of chloroform was added thereto andthe mixture was dissolved by stirring at room temperature for one hour. Next, 6 g of 2,2-bis(4-(4-maleimidophenoxy)phenyl)-1,1,1,3,3,3-hexafluoropropane was added to the mixture and the resulting mixture was stirred for one hour to obtain the desired varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain two sheets of the films each having a thickness of about 0.030 mm from which chloroform was removed. One of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Comparative Example 3

After setting a stirring rod, a cooling tube and a thermometer to a one-liter three-necked flask with a stirrer, 41.0 g of 2,2-bis((4-diaminophenoxy)phenyl)propane was charged therein and dissolved by adding 415 ml of N-methyl-2-pyrrolidone. Next, while cooling with ice water, 3,3,4,4-benzophenonetetracarboxylic acid dianhydride was gradually dissolved with a small amount to obtain a polyamic acid varnish. Further, after setting a stirring rod, a cooling tube and a thermometer to a 200 ml-volume three-necked flask, 100 g of the resulting varnish was charged therein, 10 g of bis(4-maleimidophenyl)methane was added thereto and the resulting mixture was stirred for 30 minutes to obtain a varnish.

Next, a polyimide film (UPILEX 25S, trade name, available from UBE INDUSTRIES, LTD.) having a thickness of 0.025 mm was adhered to Pyrex glass plate with a size of 200 mm×200 mm×2 mm by using a heat-resistant tape. Further, the resulting varnish was uniformly coated by using a bar coater, and dried by heating at 100° C. for 20 minutes and at 200° C. for 20 minutes to obtain three sheets of the films each having a thickness of about 0.030 mm from which N-methyl-2-pyrrolidone was removed. By using the above-mentioned film, storage elastic modulus was measured with a tensile mode by using a viscoelastic measurement device Type DVA-200 (trade name, available from IT Keisoku Seigyo Co.). Next, by using one of the resulting films, it was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured. The results are shown in Table 1 and Table 2.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25 mm×25 mm was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

Comparative Example 4

After setting a stirring rod, a cooling tube and a thermometer to a 200 ml-volume three-necked flask, 15 g of the varnish obtained in Example 5 and 80 g of m-cresol were charged therein and the mixture was dissolved by stirring at room temperature for one hour.

Next, a polyimide film (UPILEX 25S, trade name, available from UBE INDUSTRIES, LTD.) having a thickness of 0.025 mm was adhered to Pyrex glass plate with a size of 200 mm×200 mm×2 (mm) by using a heat-resistant tape. Further, the resulting varnish was uniformly coated by using a bar coater, and dried by heating at 100° C. for 20 minutes and at 200° C. for 20 minutes to obtain three sheets of the films each having a thickness of about 0.030 mm from which m-cresol was removed. By using the above-mentioned film, storage elastic modulus was measuredwith a tensile mode by using a viscoelastic measurement device Type DVA-200 (trade name, available from IT Keisoku Seigyo Co.). The storage elastic modulus of this film is, as shown in FIG. 1, gradually lowered as the temperature becomes high and showed an abrupt decrease at the neighbor of 300° C. Next, one of the resulting films was cured by heating in a press to obtain a cured resin composition. By using the above-mentioned cured resin composition, a relative dielectric constant at 1 kHz, dielectric loss factor (tan δ), and moisture absorption amount when allowed to stand in a potassium iodide saturated condition (humidity: about 70%) for 48 hours. By using the above-mentioned cured resin composition and using a thermobalance, Type TA-2950 (trade name, available from TA Instrument Co.), a decomposition initiating (kick-off) temperature was measured.

Also, copper foils each having a thickness of 0.012 mm were attached up and down of a sheet of a dried film and the laminate was cured by heating to obtain a both surface copper-clad cured resin composition. At this time, the state of sticking out from the adhered surface of the film was evaluated with eyes and it was made an index of fluidity at the time of heat curing of the film. Further, a sample with a size of 25×25 (mm) was cut out from the both surface copper-clad cured resin composition and allowed to stand in a solder bath at 330° C. for 10 minutes, and the presence or absence of blister was confirmed. Moreover, peel strength (adhesive force) of the copper and the cured resin composition was confirmed. Curing conditions and measurement conditions, etc. are shown in Table 3.

TABLE 3

| | ε | tan δ (%) | Moisture absorption ratio (° C.) | Td | PS | Blister | Crack |
|---|---|---|---|---|---|---|---|
| Example 13 | 2.8 | 0.0010 | 0.8 | 480 | 1.2 | None | None |
| Example 14 | 2.8 | 0.0012 | 0.8 | 475 | 1.1 | None | None |
| Example 15 | 3.0 | 0.0012 | 0.9 | 475 | 1.4 | None | None |
| Example 16 | 2.8 | 0.0015 | 0.8 | 480 | 1.2 | None | None |
| Example 17 | 2.8 | 0.0012 | 0.8 | 480 | 1.2 | None | None |
| Example 18 | 2.8 | 0.0012 | 0.8 | 485 | 1.1 | None | None |
| Example 19 | 3.0 | 0.0010 | 0.9 | 485 | 1.2 | None | None |
| Example 20 | 2.8 | 0.0011 | 0.9 | 475 | 1.2 | None | None |
| Example 21 | 3.0 | 0.0012 | 0.9 | 475 | 1.1 | None | None |
| Example 22 | 3.1 | 0.0014 | 0.8 | 470 | 1.2 | None | None |
| Example 23 | 3.2 | 0.0015 | 0.9 | 480 | 1.4 | None | None |
| Comparative example 3 | 3.5 | 0.0017 | 2.0 | 470 | 0.9 | Present | Present |
| Comparative example 4 | 2.6 | 0.0012 | 0.5 | 490 | 0.3 | None | Present |

ε: relative dielectric constant (1 kHz)
tan δ: dielectric loss factor (1 kHz)
Td: 5% weight loss temperature
PS: Peeling strength (kgf/cm)

UTILIZABILITY IN INDUSTRY

According to the present invention, a resin composition excellent in electric characteristics, low moisture absorption property, thermal stability at high temperature, and moldability, and having high adhesive force, and an adhesive film can be obtained.

What is claimed is:
1. An adhesive film comprising a resin composition that comprises

(A) a polymer containing a quinoline ring represented by the following formula (1) in thestructure, and (B) a bismaleimide compound represented by the following formula (2):

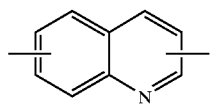
(1)

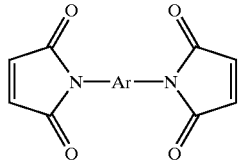
(2)

wherein Ar represents a divalent organic group containing at least two carbon atoms, and
wherein the adhesive film has a thickness of 1 to 100 μm.

2. The adhesive film according to claim 1, wherein the composition has a temperature region showing a value of a storage elastic modulus of from $10^7$ dyn/cm$^2$ to $10^2$ dyn/cm$^2$ at a temperature of 250° C. or lower, a saturation moisture absorption ratio of 1% or less, and thermal resistance at an atmosphere of 330° C. for 10 minutes or longer and an adhesive force with a material to be adhered of 0.6 kgf/cm or more.

3. The adhesive film according to claim 1, wherein (A) the polymer containing a quinoline ring is a polymer having a structure represented by the following formula (3) or (4):

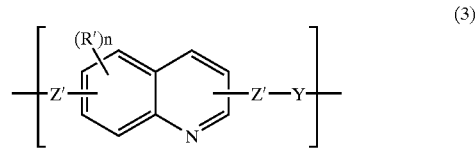
(3)

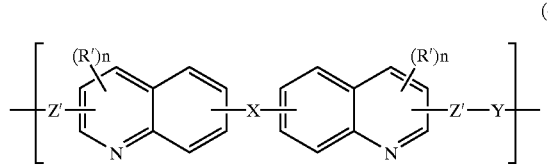
(4)

wherein R' each represents an alkyl group, an aryl group, an alkoxy group, an aryloxy group, a formyl group, an ester group, an amide group, a heteroaryl group, a cyano group or a divalent hydrocarbon group which may contain an unsaturated bond formed by binding two groups, where R represents a hydrogen atom, an alkyl group or a heteroaryl group;

n is an integer of 0 to 5;

X represents a single bond, —O—, —S—, —CO—, —SO—, —SO$_2$—, —A—, the following formula (7) or —Q—;

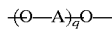
(7)

where q is an integer of 1 to 3;

A represents —Ar—O—Ar— where Ar is an arylene group, —Hr— where Hr represents a heteroarylene group, —CO—Ar—, —Ar—S—Ar—, —Ar—SO—Ar—, —Ar— or —Ar— Q—Ar—;

Q represents L1—C—L2; and L1 and L2 each represents a methyl group, a trifluoromethyl group, or a divalent hydrocarbon group formed by combining L1 and L2 together with a carbon atoms to which they are bound, which may contain one or more unsaturated bonds or may be substituted by one or more unsaturated groups;

Z' represents a single bond or an arylene group; and

Y represents —O— or —O—A—O—.

4. The adhesive film according to claim 1, wherein the bismaleimide compound (B) has a structure represented by the formula (5) or the formula (6):

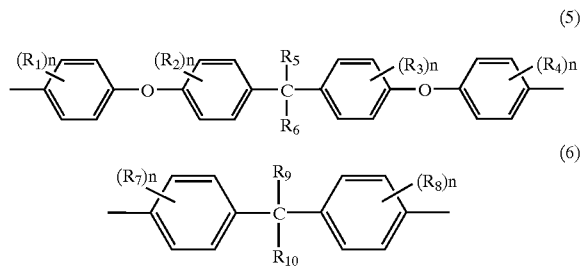

wherein $R_1$ to $R^{10}$ each represents a hydrogen atom, $CH_3$, $C_2H_5$, $CF_3$ or $C_2F_5$, which may be the same or different from each other and n is 0 or an integer of 1 to 4, which may be the same or different from each other.

5. The adhesive film according to claim 1, wherein the polymer containing a quinoline ring (A) and bismaleimide (B) have been previously dissolved in an organic solvent to produce a film and the film is dried at a final drying temperature of 150° C. to 220° C. for removing the organic solvent.

6. The adhesive film according to claim 1, wherein the polymer containing a quinoline ring (A) and bismaleimide (B) have been previously dissolved in an organic solvent to produce a film and the film is dried at a final drying temperature of 160° C. to 200° C. for removing the organic solvent.

7. The adhesive film according to claim 1, wherein the polymer containing a quinoline ring (A) and bismaleimide (B) have been previously dissolved in an organic solvent to produce a film and the film is dried at a final drying temperature of 160° C. to 180° C. for removing the organic solvent.

8. The adhesive film according to claim 1, wherein the polymer (A) containing the quinoline ring is a polymer containing a 6,6'-bis[2-(4-fluorophenyl)-4-phenylquinoline] unit.

9. The adhesive film according to claim 8, wherein the bismaleimide compound (B) is 2,2-bis[4-(4-maleimidophenoxy)phenyl]propane.

10. The adhesive film according to claim 1, wherein the composition comprises 30% by weight to 99.9% by weight of the polymer (A) containing the quinoline ring and 0.1% by weight to 70% by weight of the bismaleimide compound (B).

11. The adhesive film according to claim 1, wherein the composition contains 0.1 to 30% by weight of the bismaleimide compound (B) based on the total solid component of the composition.

12. The adhesive film according to claim 1, wherein the composition comprises 5 to 30% by weight of the bismaleimide compound (B) based on the total solid component of the composition.

13. The adhesive film according to claim 1, wherein the film has a thickness of 5 to 50 $\mu$m.

14. The adhesive film according to claim 1, wherein the film has a thickness of 15 to 30 $\mu$m.

15. The adhesive film useful as an interlayer insulation film for electronic parts according to claim 1.

* * * * *